(12) United States Patent
Ward et al.

(10) Patent No.: US 8,923,305 B2
(45) Date of Patent: *Dec. 30, 2014

(54) FLOODING-BASED ROUTING PROTOCOL HAVING DATABASE PRUNING AND RATE-CONTROLLED STATE REFRESH

(71) Applicant: Juniper Networks, Inc., Sunnyvale, CA (US)

(72) Inventors: David Ward, Los Gatos, CA (US); David M. Katz, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/735,931

(22) Filed: Jan. 7, 2013

(65) Prior Publication Data

US 2013/0121211 A1    May 16, 2013

Related U.S. Application Data

(63) Continuation of application No. 12/954,128, filed on Nov. 24, 2010, now Pat. No. 8,351,438.

(60) Provisional application No. 61/375,202, filed on Aug. 19, 2010.

(51) Int. Cl.
| | |
|---|---|
| H04L 12/28 | (2006.01) |
| H04L 12/751 | (2013.01) |
| H04L 12/759 | (2013.01) |
| H04L 12/801 | (2013.01) |
| H04L 12/755 | (2013.01) |
| H04L 12/721 | (2013.01) |

(52) U.S. Cl.
CPC .............. *H04L 45/02* (2013.01); *H04L 45/028* (2013.01); *H04L 47/39* (2013.01); *H04L 45/021* (2013.01); *H04L 45/32* (2013.01)
USPC .......................................................... 370/400

(58) Field of Classification Search
CPC .................................................... H04L 45/028
USPC ......................................................... 370/400
See application file for complete search history.

(56) References Cited

U.S. PATENT DOCUMENTS

| 7,184,437 B1 | 2/2007 | Cole et al. |
| 7,739,403 B1 | 6/2010 | Balakrishna et al. |

(Continued)

OTHER PUBLICATIONS

Second Office Action from Chinese counterpart application No. 201110240233.5, dated Jun. 5, 2014, 8 pp.

(Continued)

*Primary Examiner* — Dang Ton
*Assistant Examiner* — Kevin Lee
(74) *Attorney, Agent, or Firm* — Shumaker & Sieffert, P.A.

(57) ABSTRACT

An enhanced, flooding-based link state routing protocol is described that provides pruning of link state data and, when needed, rate-controlled refresh of the pruned link state data from other routers of the flooding domain. A routing device comprises a network interface to send and receive packets over a layer-two (L2) communication medium. The routing device includes a control unit coupled to the network interface, and a flooding-based link state routing protocol executing on a processor of the control unit. The link-state routing protocol establishes an adjacency with a peer router. A database of the routing device includes entries that store a plurality of link state messages for a flooding domain of the link state routing protocol, wherein at least one of the entries in the database stores a partial link state message having a header portion and a payload having pruned link state data.

25 Claims, 6 Drawing Sheets

(56) References Cited

U.S. PATENT DOCUMENTS

| | | | |
|---|---|---|---|
| 7,804,769 | B1 | 9/2010 | Tuplur et al. |
| 8,351,438 | B2 | 1/2013 | Ward et al. |
| 2008/0044181 | A1 | 2/2008 | Sindhu |
| 2008/0240118 | A1 | 10/2008 | Roy et al. |

OTHER PUBLICATIONS

Translation and Original Notification of the First Office Action mailed Sep. 22, 2013 in corresponding CN Application No. 201110240233.5, 11 pgs.

Zimmerman, "OSI Reference Model—The ISO Model of Architecture for Open Systems Interconnection," IEEE Transaction on Communications, vol. 28, No. 4, Apr. 1980, pp. 425-432.

Moy, "OSPF Version 2," Network Working Group, RFC 2328, Apr. 1998, 204 pp.

International Standard ISO/IEC10589, Informational technology—Telecommunications and information exchange between systems—Intermediate System intra-domain routeing information exchange protocol for use in conjunction with the protocol for providing the connectionless-mode network service (ISO-8473), Second edition, Nov. 15, 2002, 210 pp.

"IS-IS Link-State Database," found at http://cisco.iphelp.ru/faq/5/ch10lev1sec3.html, retrieved on Jul. 26, 2010, 7 pp.

"IS-IS Database Synchronization," found at http://fengnet.com/book/OSPFandISIS/ch06lev1sec2.html, retrieved on Jul. 16, 2010, 13 pp.

U.S. Appl. No. 12/954,099, by David M. Katz, filed Nov. 24, 2010.

Choudhury, "Prioritized Treatment of Specific OSPF Version 2 Packets and Congestion Avoidance", Network Working Group RFC 4222, Oct. 2005, 15 pp.

Schoenen, Rainer and Achim Dahlhoff, "Closed Loop Credit-Based Flow Control with Internal Backpressure in Input and Output Queued Switches", Proceedings of the IEEE Conference on High Performance Switching and Routing, 2000, pp. 195-203.

Ash et al. "Congestion Avoidance & Control for OSPF Networks", Network Working Group, <draft-ash-manral-ospf-congestion-control-00.txt, Apr. 2002, 18 pp.

Zinin et al. "Flooding Optimizations in Link-State Routing Protocols", Network Working Group, draft-ietf-ospf-isis-flood-opt-01.txt, Mar. 2001, 12 pp.

Dai et al., "Performance Analysis of Broadcast Protocols in Ad Hoc Networks Based on Self-Pruning", IEEE Transactions on Parallel and Distributed Systems, vol. 15, No. 11, Nov. 2004, pp. 1027-1040.

Balay et al., "IS-IS Mesh Groups", Network Working Group, RFC 2973, The Internet Society, Oct. 2000, 9 pp.

"Private Network-Network Interface" Specification Version 1.0 (PNNI 1.0), The ATM Forum—Technical Committee, af-pnni-0055.000, Mar. 1996, 385 pp.

Extended European Search Report mailed Dec. 30, 2011, in corresponding EP Application No. 11177069.9, 6 pp.

Notice of Allowance in U.S. Appl. No. 12/954,128, dated Oct. 30, 2012, 19 pp.

Non-Final Office Action in U.S. Appl. No. 12/954,099, dated Sep. 19, 2012, 12 pp.

Response to Non-Final Office Action from U.S. Appl. No. 12/954,099, filed Dec. 13, 2012, 11 pp.

Notice of Allowance in U.S. Appl. No. 12/954,099, dated Mar. 14, 2013, 8 pp.

FLOODING-BASED ROUTING PROTOCOL HAVING DATABASE PRUNING AND RATE-CONTROLLED STATE REFRESH

This application is a continuation of U.S. application Ser. No. 12/954,128, filed Nov. 24, 2010, which claims the benefit of U.S. Provisional Application No. 61/375,202, filed Aug. 19, 2010, the contents of each of which are hereby incorporated by reference.

TECHNICAL FIELD

The invention relates to computer networks and, more particularly, to routing protocols used within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. That is, flooding-based routing protocols require that all routers in the routing domain store all of the routing information that has been distributed according to the protocol. In this way, the routers are able to select routes that are consistent and loop-free. Further, the ubiquity of the routing information allows the flooding process to be reliable, efficient and guaranteed to terminate. In operation, each router typically maintains an internal link state database and scans the entire database at a defined interval to generate and output link state messages so as to synchronize the database to neighboring routers within the routing domain. In this way, link state is propagated across the entire routing domain and stored in full at each router within the domain.

For example, Open Shortest Path First (OSPF) and Intermediate system to intermediate system (IS-IS) routing protocols are link state protocols that use link state messages to ensure their routing topology is synchronized with respect to available interfaces, metrics and other variables associated with network links. OSPF utilizes Link State Advertisements (LSAs) while IS-IS uses Link State Protocol Data Units (LSPs) to exchange information. A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)," ISO, ISO/IEC 10589:2002, the entire contents of which is incorporated herein by reference.

Recently, flooding-based routing protocols have been extended to carry significant information between routers that is ancillary to routing control. For example, in addition to carrying topology information, routing protocols have been extended to carry implementation-specific information, such as configuration data, hardware inventory, additional capability information and other information.

SUMMARY

In general, an enhanced, flooding-based routing protocol is described that provides techniques for pruning a link state database on a router-by-router basis. The techniques allow each router to independently and locally determine the link state information required within its internal link state database. Each router is able to discard any part of the link state data while maintaining other parts. The techniques allow the benefits and guarantees of a flooding-based scheme to be realized, yet allow each router to independently prune state information once the router has reliably flooded the state information to its neighbor routers.

Moreover, the techniques described herein allow routers to refresh the entire state data for the routing domain to a router that is newly added to the routing domain, restarted or otherwise requires complete state for the domain. That is, the newly available router is guaranteed to receive all of the link state information previously flooded within the routing domain via the flooding-based routing protocol regardless of which portions of the link state information its neighboring routers may have pruned from their local link state databases. In this way, any neighbor of a newly available router is able to pass the entirety of the aggregate state in the flooding domain to the new router, as may be required for strict compliance of certain flooding-based routing protocols. The newly available router, like the other routers, is then able to selectively determine which pieces of state information to discard.

An amount of resources consumed with respect to a router's local link state database (e.g., a memory footprint) can be bounded, even on a transient basis when refreshing flooding-state throughout the network to support one or more newly started routers. For example, refresh of the entire state data across the routing domain to the newly available router may be performed in a rate-controlled manner that does not overrun the routers when temporarily restoring and flooding the state data. That is, in some circumstances, each router is able to reduce or even temporarily halt flooding-based transmissions necessary to refresh the state data for the routing domain to the newly available router. By implementing such a mechanism, the distribution mechanism for the flooding-based routing protocol within a network can be implemented as a "pull" model in which the individual routers charged with refreshing the newly available router ultimately control the burst-rate and average-rate at which the state information flows across the network. Consequently, in accordance with the principles described herein, each router within the flooding-based routing domain may individually control the resource impact it experiences when refreshing previously pruned link state information so the information can ultimately be flooded to the newly available router in accordance with synchronization requirements of the flooding-based protocol.

The mechanisms described herein can be deployed in a backward-compatible fashion with extensible flooding-based routing protocols, such as IS-IS.

In one embodiment, a routing device comprises a network interface to send and receive packets over a layer-two (L2) communication medium. The routing device includes a control unit coupled to the network interface, and a flooding-based link state routing protocol executing on a processor of the control unit. The link-state routing protocol establishes an adjacency with a peer router over the layer-two (L2) communication medium. A database of the routing device includes entries that store a plurality of link state messages for a flooding domain of the link state routing protocol, wherein at least one of the entries in the database stores a partial link state message having a header portion and a payload having pruned link state data.

In another embodiment, a method comprises establishing a link-state routing adjacency between a first router and a second router over a layer-two (L2) communication medium in accordance with a flooding-based link-state routing protocol. The method includes receiving, with the first routing device, a link state message in accordance with the link state routing protocol, wherein the link state message contains link state data for a flooding domain of the link state routing protocol, and storing the link state message to a database of the first router. The method further comprises, flooding the link state message from the first router to at least a third router of the flooding domain and, after receiving an acknowledgement from the third router, pruning at least a portion of the link state data from the link state message stored within the database without deleting the entire link state message.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
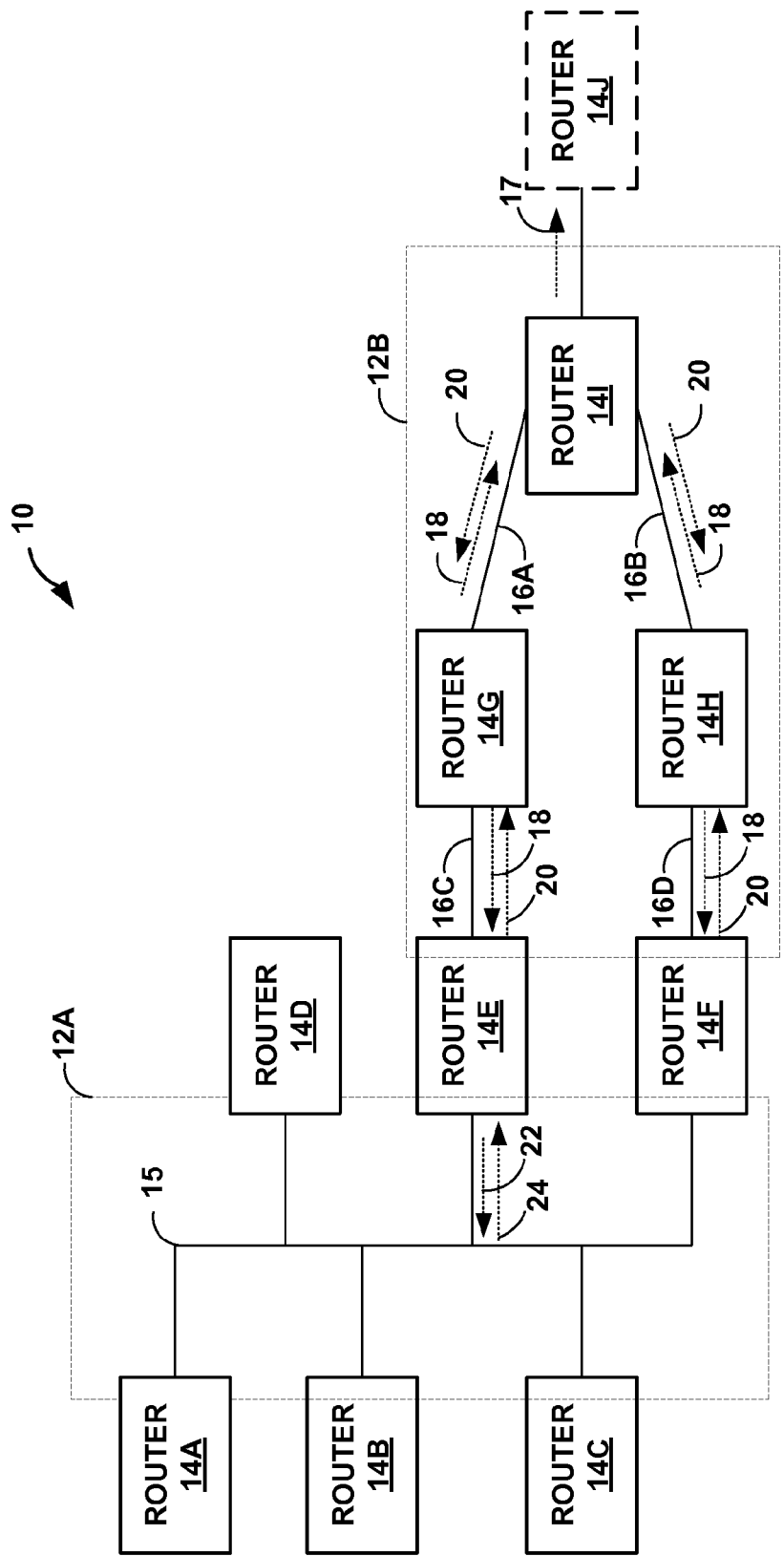
FIG. 1 is a block diagram illustrating an exemplary network system in which one or more routers utilize an enhanced link state protocol that employs database pruning and rate-controlled refresh consistent with the principles of the invention.

FIG. 1 is a block diagram illustrating an exemplary flooding domain 10 that supports an enhanced link state protocol consistent with the principles of the invention. For ease of illustration, the example flooding domain 10 is shown to include two networks 12A, 12B that use different forms of underlying layer two (L2) communications media. For example, network 12A uses "multi-access media" 15 in which all L2 communications for the network are sent to (i.e., broadcasted to) all routers 14A-14F coupled to the network. One example of a broadcast network is an Ethernet network, for example, in which an Ethernet frame is communicated to all nodes of the network. In contrast, network 12B uses point-to-point L2 communication media, such as optical links 16A-16D. In this case, routing protocol update messages are sent between adjacent routers in a point-to-point manner and are processed and terminated by those routers. In this example, routers 14E, 14F are physically present in both networks 12A and 12B utilizing different physical interfaces provided by the routers. Although not shown in FIG. 1, flooding domain 10 may include other network devices, such as switches and hubs. Further, although not shown in FIG. 1, each of routers 14 typically services a variety of end-user computing devices, such as laptop computers, desktop computers, workstations, personal digital assistants (PDAs), and cellular phones. Although described for purposes of example as routers, routers 14 may be other network devices that incorporate routing functionality in addition to other integrated functions.

Flooding domain 10 is shown with respect to networks 12A, 12B that utilize L2 multi-access media 15 and L2 point-to-point media 16 for ease of illustrating the techniques described herein. Reference to layers herein, such as L2 and L3, refer to the corresponding layer in the Open Systems Interconnection (OSI) model. In particular, L2 refers to the data link layer within the OSI model. The data link layer may provide the functional and procedural methods to transfer data between the network devices and to detect and possibly correct errors that may occur in the physical layer. An example of a L2 communication medium is an Ethernet network. L3 refers to the network layer within the OSI model. The network layer may provide the functional and procedural methods for transferring variable length data sequences from a source to a destination via one or more networks while maintaining the quality of service requested by higher layers. An example of an L3 protocol is the Internet Protocol (IP). More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein.

Generally, routers 14 use flooding-based routing protocols to announce topology information to each other and synchronize routing topology databases maintained by each of the routers. As described herein, routers 14 support an enhanced link state protocol (LSP) that has been extended in the manner described herein by which receiving routers that consume topology information are able to control both the average and the burst rate of flood-based transmissions by the sending routers. In one example, a new, opaque Type, Length, Value (TLV) is defined that can be carried by various types of link state messages that are already used within flooding domain 10. The TLV may include a first field for carrying a transmission credit that allows a router to control the average rate at which another router floods information to an adjacency. In addition, the TLV may include a second field for carrying a minimum time interval, e.g., in microseconds, which the sending router must delay between each successive packet transmission. This allows the receiving router to control a policer within the sending router, and thus the packet burst rate, with very low reverse bandwidth consumption. By implementing such a mechanism, the link state messages for the flooding-based routing protocol within flooding domain 10 can be implemented as a "pull" model in which the rate at which topology information is consumed by individual receiving routers 14 ultimately controls the flow of data through the network system. Further example details of the enhanced link state protocol can be found in Katz et. al., U.S. Patent Application Ser. No. 61/375,166, entitled "FLOODING-BASED ROUTING PROTOCOL HAVING AVERAGE-RATE AND BURST-RATE CONTROL," filed Aug. 19, 2010, the entire contents of which are incorporated herein by reference.

In accordance with the flooding-based protocol, each router 14 maintains an internal link state database and outputs link state messages so as to propagate the entire link state throughout flooding domain 10. For example, routers 14 within flooding domain 10 typically exchange initial link state messages to establish the adjacency relationship. For example, routers 14 may exchange IS-IS HELLO protocol data units (PDUs) to establish adjacencies with other routers. In addition, routers 14 utilize flooding-based link state messages to synchronize routing topology databases maintained by each of the routers. Each link state message is typically refreshed periodically on the network and is acknowledged by the receiving routers. For example, routers 14 may utilize periodic IS-IS link state PDUs for synchronizing their routing topology databases and utilize partial sequence number packet data units PDUs (PSNPs) and complete sequence numbers PDUs (CSNPs) to acknowledge receipt of the information.

As one example, router 14I within network 12B typically establishes separate adjacencies with routers 14G and 14H as peer routers. Routers 14G-14I periodically exchange link state messages on links 16 to ensure that the routers maintain synchronized link state databases. For example, routers 14G, 14H periodically output link state messages 18 to the flooding domain. Upon receiving the link state messages 18, router 14I responds with acknowledgement link state messages 20, such as IS-IS PSNPs or CSNPs. When distributing link state data within broadcast network 12A, routers 14A-14F flood multicast link state messages through multi-access media 15, e.g., switched Ethernet media. Continuing the above example, in response to receiving link state messages from router 14G, router 14E may output one or more multicast link state messages 22 on multi-access media 15 to flood link state data to the multi-access media and receive acknowledgements 24 from each of routers 14A-14D. In one example, router 14E periodically outputs link state messages 22 to multi-access media 15 as IS-IS link state PDUs and receives acknowledgements 24 in the form of IS-IS CSNPs from each of routers 14A-14D acknowledging receipt of the information.

This interaction continues so that routers 14 are synchronized in that all of the routers have been informed of complete state data for the entire flooding domain 10 and have informed their neighboring routers of the compete state data. During this process, each router 14 independently and locally determines the link state information required to be kept within its internal link state database. In accordance with the individual determination, each router 14 independently prunes certain link state information from its internal link state database once the router has reliably flooded the state information to its neighbor routers. In this way, the internal link state database may have database entries that store complete link state messages and partial link state messages for which some or all of the message's link state data has been pruned.

Moreover, the techniques allow routers 14 to refresh the entire state data for the routing domain to a router that is newly added to the routing domain, restarted or otherwise requires complete state for flooding domain 10. For example, the techniques guarantee that newly available router 14J receives all of the link state information previously flooded within flooding domain 10 via the flooding-based routing protocol regardless of which portions of the link state information its neighboring router 14I may have pruned from its local link state databases. That is, neighboring router 14I is able to output link state messages 17 that pass the entirety of the aggregate state in the flooding domain 10 to new router 14J, as may be required for strict compliance of the flooding-based routing protocol. Newly available router 14J, like the other routers 14, then is able to selectively determine which pieces of state information to discard.

For example, upon detecting newly available router 14J or another event requiring router 14I to flood link state data to router 14J, router 14I initiates retrieval of all "needed" partial link state messages so that corresponding complete link state messages can be retrieved from other neighboring routers. Moreover, during retrieval of the pruned link state messages, router 14I may manipulate acknowledgement mechanisms of the link state protocol so as to selectively retrieve the pruned link state messages from other routers of the flooding domain. For example, router 14I may formulate and output acknowledgement messages 20 in the form of one or more IS-IS PSNPs that act as database synchronization messages that specify identifiers for the needed partial link state messages. In this example, router 14I forms the PSNPs so as to specify sequence numbers that are lower than a current sequence number for the needed link state messages, which upon receipt by neighboring routers 14G, 14H triggers re-flooding of the link state messages by the neighboring routers 14G, 14H. For example, router 14I may set the sequence numbers in the PSNPs to zero for the needed link state messages. As another example, router 14I may output acknowledgement messages 20 in the form of CSNPs that describe an entire content of the link state database of router 14I. In this case, router 14I removes an entry for the link state message from the CSNPs to direct the routers 14G and 14H to re-flood the missing link state message to router 14J. Consequently, rather than merely serving as acknowledgement messages for previously received link state messages, acknowledgement messages 20 are manipulated so as to trigger fetching further copies of previously received but pruned link state messages.

If routers 14G, 14H have similarly pruned the needed link state messages, the routers may in turn output database synchronization messages in the form of acknowledgement messages to request any needed link state messages from their neighbor routers. If any router within the flooding domain 10 has the needed link state message, either by having a full link state database or by not having pruned the link state message, that router floods the needed link state message back across the flooding domain to router 14I for processing and flooding to the newly available router 14J. In the worst case, requests for refreshing a link state message may be forwarded across an entire flooding domain 10 until the requests reach the originator of the link state message, which in turn will flood the requested link state message back across the domain 10 and the refresh process will terminate, at which point the intermediate routers within the flooding domain may again prune the link state message.

In some aspects, the refresh of the entire state data across flooding domain 10 to newly available router 14J may be performed in a rate-controlled manner that does not overrun routers 14A-14I when temporarily restoring and flooding the state data. That is, in some circumstances, each router is able to reduce or even temporarily halt flooding-based transmissions being sent to refresh the state data for the routing domain to the newly available router. In this way, an amount of resources consumed with respect to each router 14 by its local link state database (e.g., a memory footprint) can be bounded, even on a transient basis when refreshing flooding-state throughout flooding domain 10 to support newly available router 14J. By implementing such a mechanism, the distribution mechanism for the flooding-based routing protocol within flooding domain 10 can be implemented as a "pull" model in which the individual routers 14A-14I charged with refreshing newly available router 14J ultimately control the burst-rate and average-rate at which the state information flows across the flooding domain 10. Consequently, in accordance with the principles described herein, each router 14A-14I within the flooding-based routing domain 10 may individually control the resource impact it experiences when refreshing previously pruned link state information so the information can ultimately be flooded to newly available router 14J in accordance with synchronization requirements of the flooding-based protocol.

Figure 2:
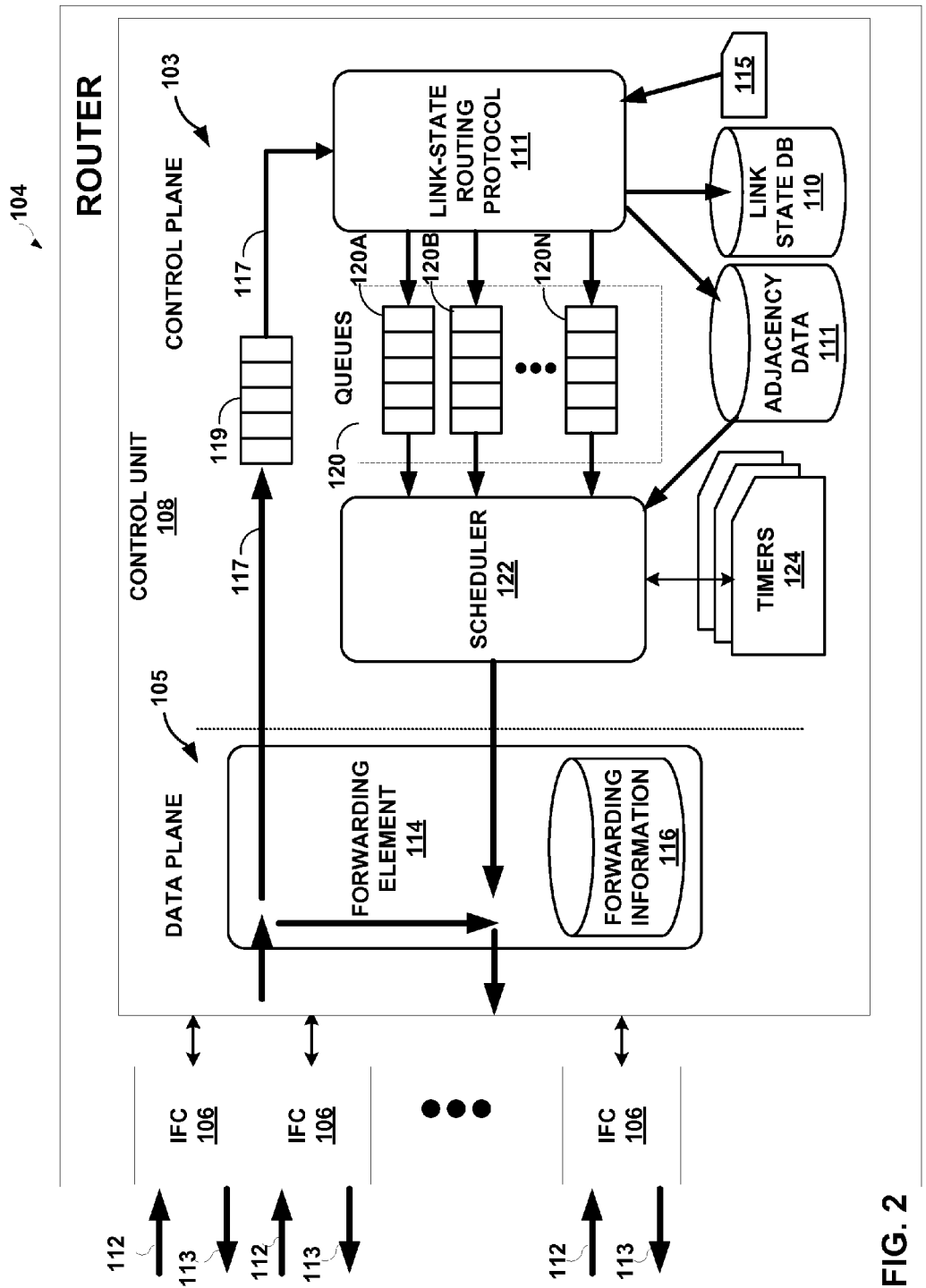
FIG. 2 is a block diagram illustrating an example embodiment of a router that implements the techniques described herein.

FIG. 2 is a block diagram illustrating an example router 104 configured consistent with the principles of the invention. Router 104 may, for example, represent any of routers 14 of FIG. 1. In the exemplary embodiment illustrated in FIG. 2, router 104 includes one or more interface cards (IFCs) 106 for sending and receiving packets using network links 112 and 113. IFCs 106 are typically coupled to network links 112, 113 via a number of physical interface ports. In general, router 104 receives inbound packets from network links 112, determines destinations for the received packets, and outputs the packets on network links 113 based on the destinations. In this way, network links 112, 113 provide L2 communications media for transmitting packets. Any of network links 112, 113 may be multi-access media, such as an Ethernet network, or point-to-point media such as optical connections.

In general, router 104 has a control unit 108 that provides a control plane 103 and a data plane 105. Control plane 103 is primarily responsible for maintaining a link state database (DB) 110 to reflect the current link state data of the flooding domain. For example, control unit 108 provides an operating environment for execution of link-state routing protocol 111 that router 104 uses to communicate with peer routers and to periodically update link-state DB 110 to accurately reflect the link state data of the flooding domain (e.g., flooding domain 10 of FIG. 1) within which router 104 operates. Example link-state routing protocols include routing and label switching protocols, such as IS-IS and OSPF.

In one example, link-state DB 110 is structured to store link state messages (e.g., OSPF LSAs or ISIS PDUs) and access can be provided, for example, on a per link state message basis. In some protocols, such as OSPF, link-state routing protocol 111 may initiate a database-exchange process to exchange individual link state messages. In other examples, such as IS-IS, link-state routing protocol 111 may periodically describe its compete link-state DB 110 to its neighbors by outputting CSNPs that list each link state message within link state database 110. In this case, link-state routing protocol 111 may formulate the CSNPs to include identifiers for partial link state messages that have been pruned and do not currently need to be refreshed, thereby preventing the link state messages from being re-flooded by the other routers. However, link-state routing protocol 111 may formulate the CSNPs to exclude identifiers for partial link state messages that have been pruned and that are currently needing to be refreshed, thereby triggering re-flooding of the link state messages by one or more of the other routers in the flooding domain.

Link-state routing protocol 111 may maintain link-state DB 110 to store complete link state messages for state data of interest and pruned link state messages in which all or portions of the link state has been pruned. In either case, link-state routing protocol 111 manipulates link-state DB 110 to store an entry for each link state message flooded within the flooding domain. For complete link state messages, each corresponding entry may store link state header information as well as state data from a payload of the message. For pruned link state messages, link-state routing protocol 111 directs link-state DB 110 to prune (i.e., delete) all or portions of the payload data after the link state message has been flooded to all of the router's neighbors. Link-state routing protocol 111 marks the entry as storing incomplete link state data, and the message is referred to as a "partial" link state message. Link-state routing protocol 111 may apply pruning rules 115 that define policies specified by an administrator or provisioning system for identifying link state messages within link-state DB 110 that are candidates for pruning Pruning rules 115 may specify conditions and Boolean operators for matching, for example, portions of the header information of the link state message, portions of the link state data carried within the payloads of the link state messages, the interface or link on which the link state message was received, thresholds for current resource capacity (e.g., memory or available storage space) of router 104 or other criteria.

In accordance with link-state DB 110, forwarding element 114 maintains forwarding information 116 that associates network destinations or other keying information with specific next hops and corresponding interface ports of output interface cards 106 of router 108. Control plane 103 typically processes link-state DB 110 to perform route selection and generate forwarding information 116 based on selected routes. In this way, forwarding information may be programmed into data plane 105. Control plane 103 may generate forwarding information 116 in the form of a table, list, radix tree or other data structure. U.S. Pat. No. 7,184,437, the content of which is incorporated herein by reference in its entirety, provides details on an exemplary embodiment of a router that utilizes a radix tree for route resolution.

When forwarding a transient packet, forwarding element 114 traverses forwarding information 116 based on keying information within a header of the packet to ultimately select a next hop and output interface to which to forward the packet. Based on the selection, forwarding element 114 may output the packet directly to the output interface 113 or, in the case of a multi-stage switch fabric of a high-end router, may forward the packet to subsequent stages for switching to the proper output interface. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference. The techniques of this disclosure are not limited to this architecture. In other embodiments, router 104 may be configured in a variety of ways. In one embodiment, for example, all or portions of control plane 103 and data plane 105 may be replicated and incorporated directly within IFCs 106.

As described herein, link-state routing protocol 111 is a flooding-based communications protocol that has been extended to provide rate-controlled state refresh. Control plane 103 includes output queues 120 for storing link state messages for respective routing adjacencies maintained by link-state routing protocol 111. For example, output queue 120A may store outbound link state messages for a first routing adjacency while output queue 120B may store outbound link state messages for a second routing adjacency. When dequeuing output link state messages for transmission via forwarding element 114, scheduler 122 controls transmission of the link state messages based on a burst-rate flow control (i.e., minimum packet interval) and, in the event the adjacency is reachable via a point-to-point communications medium, an average-rate flow control (i.e., credit) specified for the adjacency.

Forwarding element 114 of data plane 105 communicates inbound link state messages 117 to inbound queue 119 for delivery to link-state routing protocol 111. Link-state routing protocol 111 processes the inbound link state messages to flood each of the inbound link state message to other neighboring routers by generating link state messages and transmitting the link state messages via output queues 120.

Upon receiving acknowledgement messages from all neighbors for a given link state message, link-state routing protocol 111 applies the pruning rules to determine whether the link state message is to be pruned from link-state DB 110 as described herein.

When processing the inbound link state messages, link-state routing protocol 111 also updates adjacency data 111 to maintain an entry for each adjacency established with another router. For example, each entry within adjacency data 111 specifies an identifier for the adjacency (e.g., IP address), the current credit allocated for the adjacency by the other router, the minimum packet interval for the adjacency as set by the other router, and the type of L2 communication medium by which the adjacency is reachable, i.e., point-to-point or multi-access. Link-state routing protocol 111 updates the burst-rate and average-rate flow control data for a given adjacency upon receiving an inbound links state message (e.g., an IS-IS HELLO, PSNP or CSNP) for that adjacency. In this case, link-state routing protocol 111 parses the credit allocation and the current minimum packet interval as carried by a unique TLV and updates adjacency data 111, thereby adjusting the rate at which scheduler 122 transmits output link state messages for that adjacency.

Adjacencies reachable by the same L2 communications medium, i.e., a multi-access medium, may be marked within adjacency data 111 so as to group the adjacencies records. When dequeuing any output link state messages for the group, scheduler 122 controls the transmission based the longest minimum time interval specified by any of the adjacencies without regard to any current transmission credit for the adjacencies. Scheduler 122 maintains a timer 124 for each adjacency, or group of adjacencies in the case of multi-access media, and only outputs a link state message for a given adjacency when the minimum packet interval for that adjacency has been satisfied.

Figure 3:
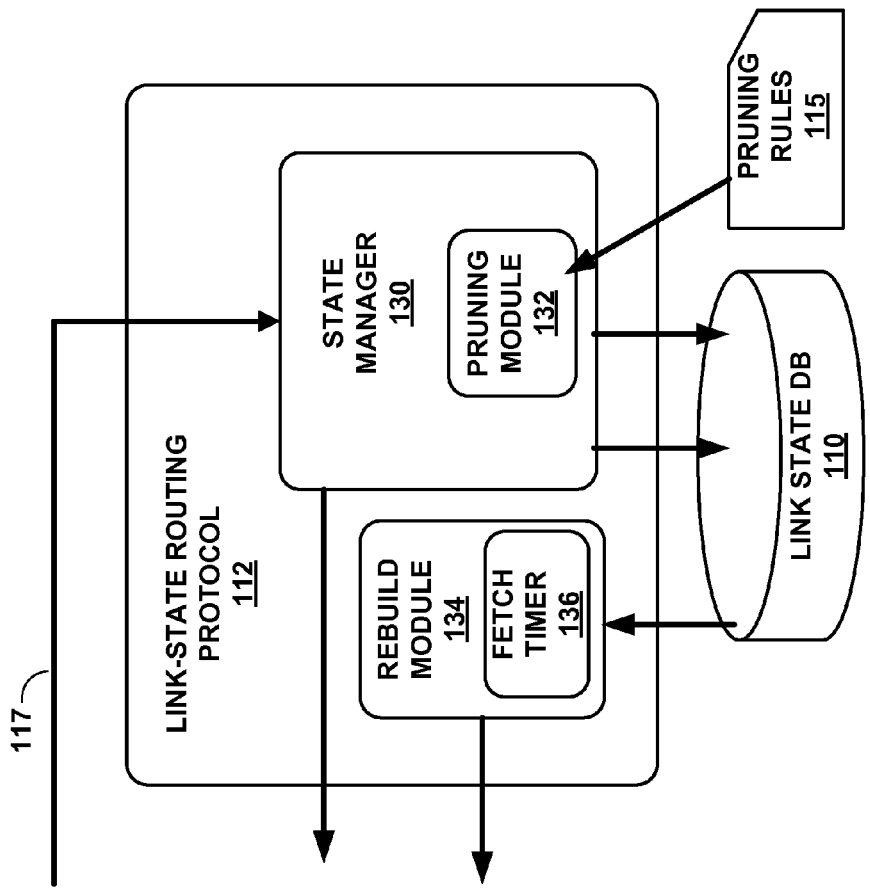
FIG. 3 is a block diagram illustrating further details of the example router of FIG. 2.

FIG. 3 is a block diagram illustrating an example embodiment of link-state routing protocol 111 in further detail. In this example, link-state routing protocol 111 includes a state manager 130 that operates in accordance with a defined state machine to process link state messages and periodically synchronize link-state DB 110 to neighboring routers in accordance with the requirements of the link state protocol. Moreover, as shown in FIG. 3, state manager 130 includes pruning module 132 that prunes all or portions of the payload data of an entry after the link state message has been flooded to all of the router's neighbors. After pruning, link-state routing protocol 111 marks the entry as storing incomplete link state data.

Pruning module 132 applies pruning rules 115 that define policies specified by an administrator or provisioning system for identifying link state messages within link-state DB 110 that are candidates for pruning Pruning rules 115 may specify conditions and Boolean operators for matching portions of the header information of the link state message, portions of the link state data carried within the payloads of the link state messages, the interface or link on which the link state message was received, thresholds for current resource capacity (e.g., memory or available storage space) of router 104 or other criteria.

In general, state manager 130 maintains link state database 110 to store entries for each link state message for the entire state of the flooding domain. That is, as new link state messages are received, state manager 130 may store complete link state message including header information as well as state data from a payload of the message. Once the new links state messages are flooded to neighboring routers and acknowledged, pruning module 132 applies pruning rules 115 (e.g., in accordance with a specified time period) and may prune link state messages from link state database 110. For example, pruning module 132 may delete the payload data from an entry without removing some or all of the header information from the entry for the link state messages, leaving what may be referred to as a "partial" link state message. In this way, entries for each link state message within the complete set of state data for the flooding domain may remain within link state database 110, but the memory and storage requirements associated with the link state database may be reduced.

Moreover, in the event rebuild module 134 needs to refresh the entire state data for the flooding domain (e.g., for transmission to a newly available router), rebuild module 134 rebuilds the state data for the incomplete link state messages within link state database 110 by requesting the link state messages from neighboring routers. In this way, the newly available router is able to receive all of the link state information previously flooded within the routing domain via the flooding-based routing protocol regardless of which portions of the link state information that may have pruned from link state database 110.

As described in further detail below, in one embodiment, rebuild module 134 utilizes a fetch timer 136 to trigger fetching from neighboring routers within the flooding domain any incomplete (i.e., partial) link state messages that are currently needed. For example, if any action takes place within the flooding domain that requires router 104 to send a link state message to another router within the flooding domain, rebuild module 134 determines if the link state message is currently a partial link state message (i.e., pruned) within link state database 110. If so, state manager 130 sets a flag (e.g., a "needed" bit) to mark the partial link state message as having pruned link state that needs to be restored. Upon expiration of fetch timer 136, rebuild module 134 triggers retrieval of all "needed" partial link state messages so that corresponding complete link state messages can be retrieved from other neighboring routers. If those routers have similarly pruned the needed link state message, the routers in turn request the link state message from their neighbor routers. If any neighbor has the needed link state message, either by having a full link state database or by not having pruned the link state message, the router floods the needed link state message back across the flooding domain to router 104 for processing and potentially flooding to the newly available router.

During this rebuild and refresh process, routers within the flooding domain operate in accordance with the burst rate and average rate controls specified herein. For example, any router sending link state messages to router 104 transmits them in accordance with the burst-rate and average-rate flow control settings specified by router 104. Moreover, router 104 in turn floods the link state message being refreshed to neighboring routers in accordance with the burst-rate and average flow control settings specified by each of those routers. This process continues until the link state message being refreshed reaches the newly available router. In this manner, the techniques allow the flooding-based routing protocol communication mechanism to refresh link state data as a pull-based model in which the data-receiving router has fine-grain control over the rate at which it receives data over the routing adjacency. As a result, an amount of resources consumed with respect to a router's local link state database (e.g., a memory footprint) can be bounded, even on a transient basis when refreshing flooding-state throughout a flooding domain to support one or more newly started routers. The greater the amount of pruning, both locally and in the aggregate, the higher the traffic generated for such an event. In some cases, when a router first becomes available, it is a relatively expensive operation for the router to be initialized as each link state message may need to be recovered from as far away as the originator. However, this is contrasted with a conventional flooding-based protocol IS-IS case in which the flooding impact is entirely localized to a new router's immediate neighbors and the potentially significant burden of storing compete link state data for the entire flooding domain in each router.

Figure 4:
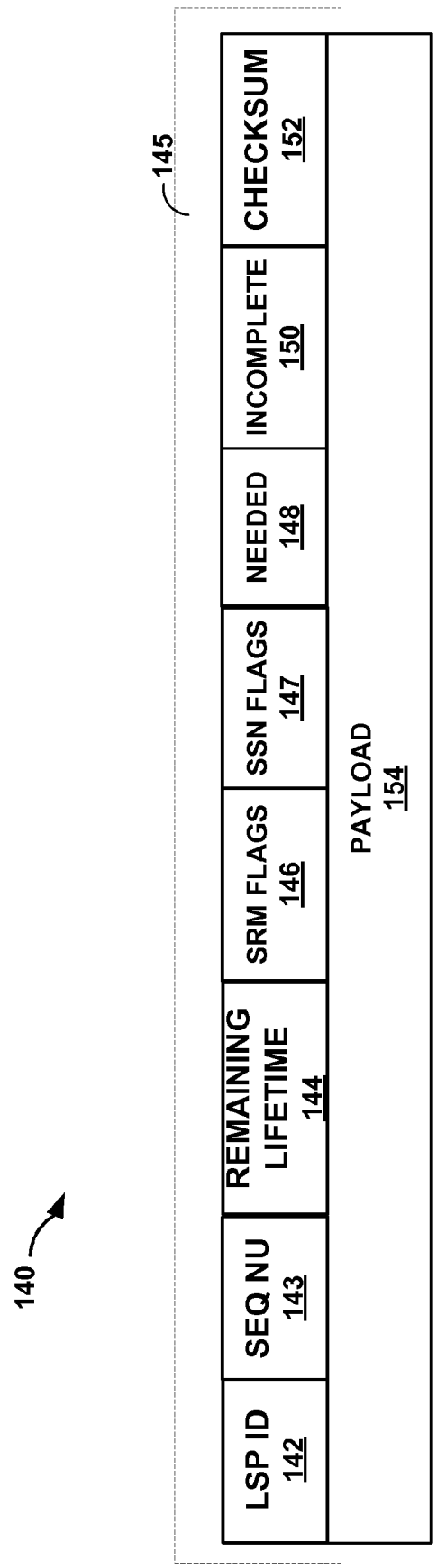
FIG. 4 is an example of an entry within a link state database maintained by the router of FIG. 2.

FIG. 4 is an example of an entry 140 within link state database 110 for a single link state message. In this example, the link state message stored in the database is shown as an IS-IS link state protocol data unit (PDU) having a header 145 and, optionally, a payload 154 of link state data.

Header 145 includes a link state PDU (LSP) identifier 142 that uniquely identifies the link state message within the flooding domain. LSP ID 142 may be formatted so as to indicate the owner of the link state message, i.e., the originating router, as well as the link state message itself.

In addition, header 145 includes a Sequence Number 143, a Remaining Lifetime 144, SRM flags 146, Needed bit 148, Incomplete bit 150 and a Checksum 152. Remaining Lifetime 144 represents an age of the link state message that begins at a defined MaxAge (e.g., 1200 seconds) and decrements to zero at which point the payload is no longer considered current link state for the flooding domain and can be removed entirely from link state database 110.

Sequence number 143 indicates the current version of the link state message. For example, the originating router typically tags the link state message with a sequence number to differentiate newer copies from older ones. The link state message sequence number is increased by one whenever the router generates a new link state message to replace an outdated version. A new version of an existing link state message is typically issued when changes occur in local surroundings of the router that need to be reported to the rest of the flooding domain. An IS-IS router periodically issues a new link state message with the same information as the previous link state message to refresh an link state message before it expires.

Send Routing Message (SRM) flags 146 are internal flags that router 104 defines for each link state message within link state database 110, where for each link state message entry contains an SRM flag for each interface of the router. When a link state message needs to be sent on a particular link, state manger 130 sets the corresponding SRM flag 146 for the interface of that link. Upon a next scan of link state database 110, any link state message entries having one or more SRM flags 146 triggers state manager 130 to formulate and output a corresponding link state message on each link for which an SRM flag is set.

Send Sequence Number (SSN) flags 147 are additional internal flags used in database synchronization procedure. Like the SRM flags 146, each link state message has one SSN flag for each of the router's IS-IS interfaces. When an SSN flag is set, it indicates that the link state message is to be described in a PSNP sent on the associated interface to perform a function similar to a link state request for that particular link state message. The SSN flag is cleared when the PSNP describing the link state message is sent.

Incomplete bit 150 is controlled by pruning module 132 to indicate whether all or portions of payload 154 have been purged and removed from the database entry. Needed bit 148 is controlled by rebuild module 134 to indicate whether complete state data for a partial link state message is currently needed in response to an event that requires refresh of the state date for the flooding domain.

Checksum 152 is used to maintain the integrity of a link state message during storage and flooding. The checksum value is inserted into the link state message by the originating router and is verified by any router that receives a copy. If the checksum does not match a value computed for the link state message, i.e., the link state message fails checksum validation, the link state message is considered as corrupted.

Payload 154 represents state data carried by the link state message and all or portions of the payload may be pruned in accordance with pruning rules 115. Payload 154 typically takes the form of one or more TLVs, each of which may be independently pruned in whole or part from the database entry.

Although not shown for purposes of example, entry 140 may store other information carried by or associated with the link state message.

Figure 5:
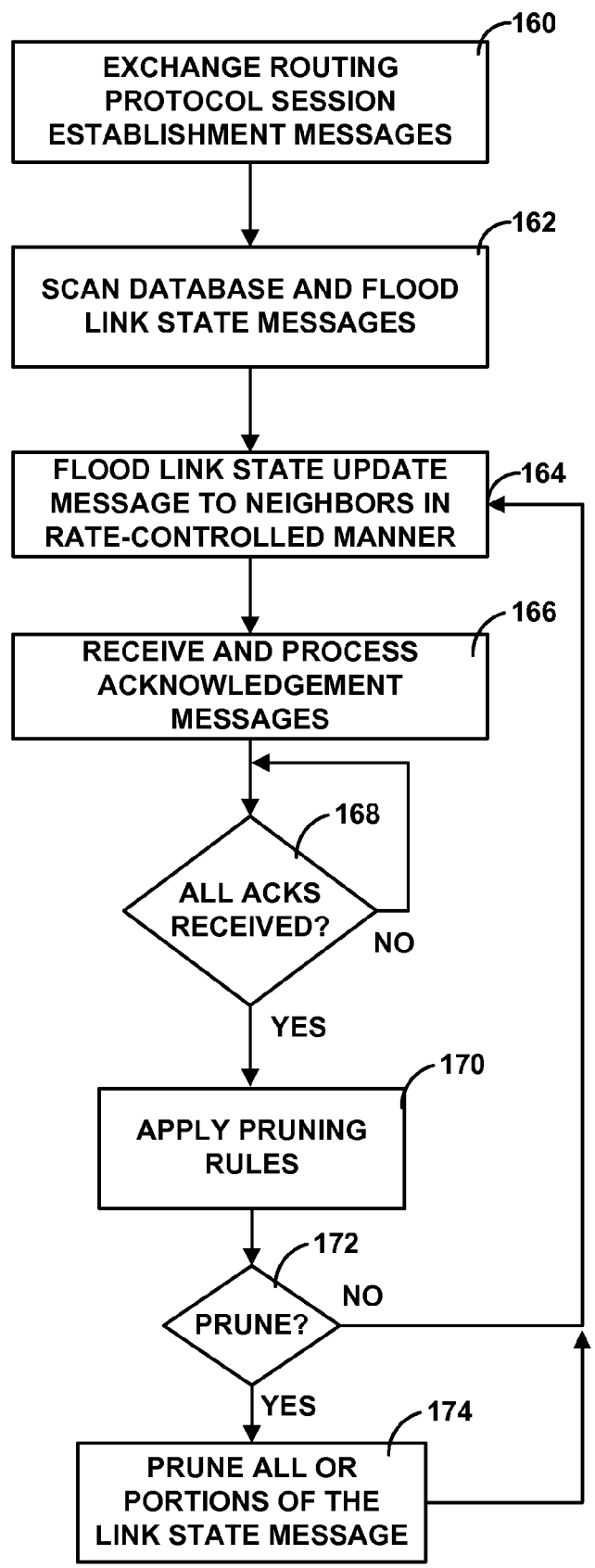
FIG. 5 is a flowchart illustrating example operation of a router maintaining and pruning a link state database.

FIG. 5 is a flowchart illustrating example operation of a router in processing and pruning link state message from its internal link state database for a flooding-based routing protocol. Although described with respect to router 104, the example operation may be implemented in any router or other device that participates in the exchange of state data using a flooding-based protocol, such as any routers 14 of FIG. 1.

Initially, router 104 exchanges session establishment messages with each of its neighboring routers to establish a corresponding adjacency for the flooding-based routing protocol (160). For example, the routers may exchange IS-IS HELLO PDUs to create the adjacency. At this time, both the routers may include a TLV within it's transmitted IS-IS HELLO PDUs so as to specify initial the burst-rate and average-rate flow control parameters for use by the other routers when sending it data-carrying routing protocol packets. The average-rate and burst-rate control information in session establishment messages serves to establish the initial credit and packet interval for controlling the initial transmissions as well as refresh of state data from its neighbors.

After establishing a flooding-based routing protocol adjacency, the routers periodically synchronize their routing topology databases using flooded link state messages. During this process, router 104 periodically formulates, and enqueues for transmission, one or more link state messages, such as IS-IS link state PDUs, for refreshing link state information to the other router (162). At this time, router 104 transmits outbound link state messages in a rate controlled manner in accordance with the current burst-rate and average-rate flow control parameters received from the other router.

In response, router 104 receives link state acknowledgement messages that acknowledge receipt of the link state update message flooded to the adjacencies (166). For example, router 104 may receive partial sequence number PDUs or a complete sequence number PDUs to acknowledge receipt of the information. At this time, link-state routing protocol 111 parses each of the PDUs to extract a TLV that conveys the current minimum packet interval and any credit allocated to the adjacency by the other router, i.e., the router from which the particular acknowledgement was received. In this manner, the techniques allow the flooding-based routing protocol communication mechanism to operate more as a pull-based model in which the data-receiving router has fine-grain control over the rate at which it receives data over the routing adjacency.

Upon receiving all acknowledgements for a given link state message entry 140 (YES of 168), pruning module 132 applies pruning rules 115 to determine whether all or portions of payload 154 for the link state message are to be pruned from link-state DB 110 (170). If so, pruning module 132 removes all or portions of payload 154 in accordance with pruning rules 115 (174).

Figure 6:
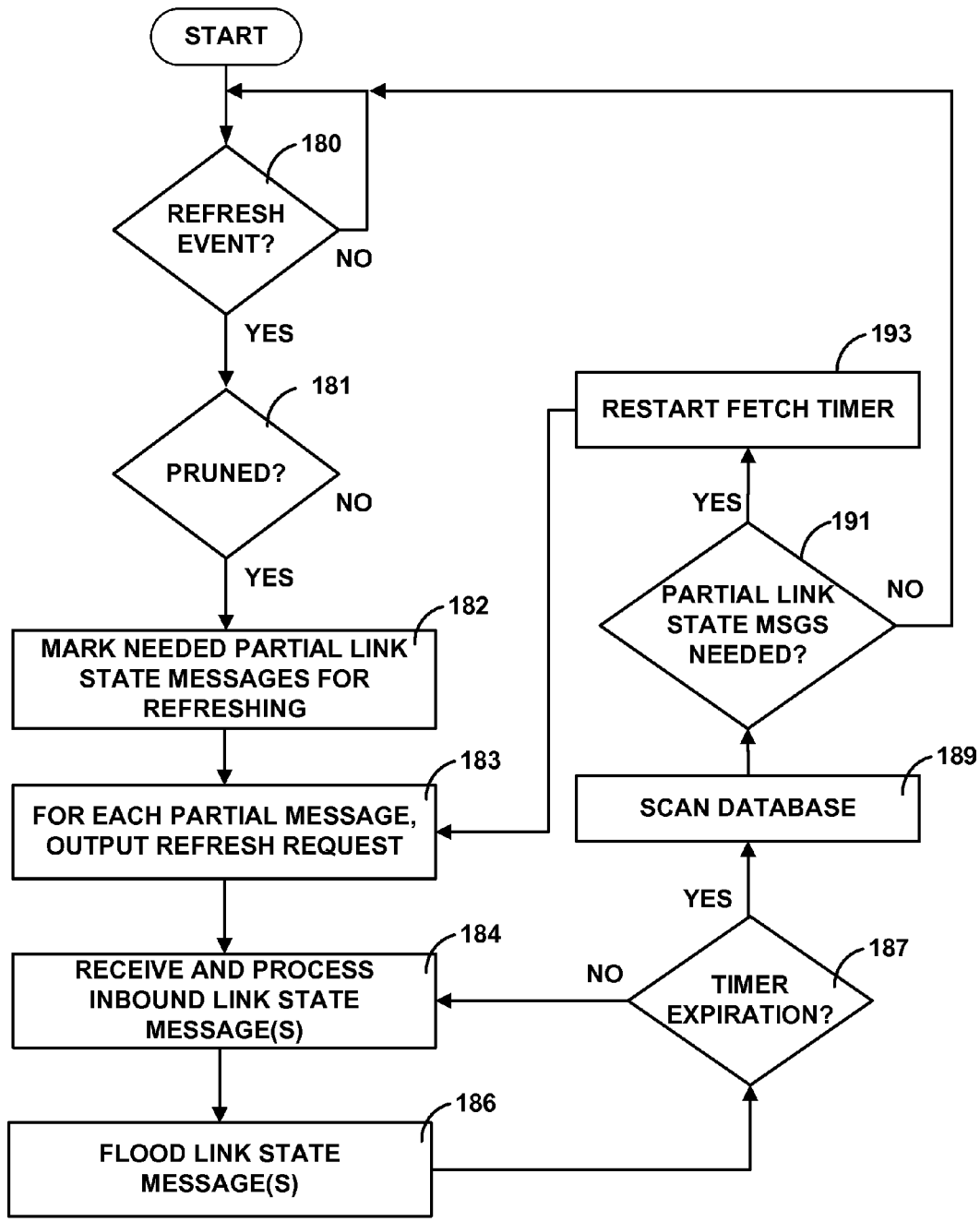
FIG. 6 is a flowchart illustrating example operation of a router in response to events that may trigger a soft refresh of previously pruned state data within its link state database.

FIG. 6 is a flowchart illustrating example operation of router 104 in response to identifying an event that requires router 104 to refresh of previously pruned link state data within link state database 110 so as to flood entire and complete versions of the link state data to the flooding domain (180). As one example of such an event, state manager 130 may determine that an inbound LSP has been received from another router, where the inbound LSP matches an entry 140 within link state database 110 but has an older sequence number than that stored within the entry. Similarly, state manager 130 may determine that a PSNP acknowledgement may have been received for an LSP but specifying a sequence number for the LSP that is older than the sequence number in link state database 110. As another example, state manager may determine that a CNSP has been received for an adjacency but that a specific LSP is not listed within the CNSP. In each of these cases, state manager 130 determines that the current version of the link state message needs to be flooded to interface that triggered the event (Yes of 180). As another example of a triggering event, state manager 130 may determine that a new point-to-point adjacency is detected on an interface and that all the state data (i.e., all LSPs) for the flooding domain need to be flooded to the adjacency.

In response to the triggering event, state manager 130 determines whether each of the LSPs that need to be flooded has currently been pruned as indicted by a state of the Incomplete bit 150 within the corresponding entry 140 of link state database 110 (181). If the LSP to be flooded has been pruned such that only a partial link state message is currently stored, rather than setting SRM flags 146 to trigger output of the link state message, rebuild module 134 initiates output of database synchronization messages for refreshing of the link state messages (183). For example, rebuild module may set sequence number 143 within entry 140 to zero, set Needed bit 148, and set an SSN flag 147 on all interfaces for that LSP and starts fetch timer 136 (182). Setting of the SSN flags 147 may causes state machine 130 to formulate and output one or more PSNPs for the partial link state messages, where the PSNPs specify sequence numbers of zero for the LSPs. As another example, setting of the SSN flags 147 may causes state machine 130 operate differently during a next database scan by formulating and outputting a CSNP having entries removed for partial link state messages.

Upon receiving inbound link-state messages (184), router 104 processes each of the message in accordance the link state protocol to update link state database 110. If the link state message includes a link state message identifier 142 that has not been seen before by router 104, state manager 130 creates a new entry 140 within link state database 110 and stores the flooded information. If, however, the inbound link state message is copy of a needed LSP and has been received in response to one of the PSNP sent by router 104, the LSP identifier of the received LSP is matched against the existing entry storing the partial LSP and the sequence number of the received link state message exceeds the sequence number 143 for the entry, which has been set to zero. As a result, state manager 130 updates payload 154 of the entry to include the complete version of the state data for the fetched link state message. At this time, state manager 130 resets needed bit 148 of the entry to indicate that the link state message has been received and resets incomplete bit 150 to indicate that the entry now stores the entirety of the state data for the LSP. State manager 130 sets SRM flags 146 for the newly created or newly updated entry to trigger flooding of the link state message during the next database scan (186). At this time, router 104 again transmits outbound link state messages in a rate controlled manner in accordance with the current burst-rate and average-rate flow control parameters associated with the particular adjacency.

In the event fetch timer 136 expires (187), rebuild module 134 scans link state topology database 110 to identify and partial LSPs that still have Needed bit 148 set (189). If additional partial LSPs exists that are designated as needed for refreshing (191), rebuild module restarts the fetch timer (193) and sets SSN flags 147 to trigger output of another batch of PSNPs to request the needed link state messages (183). Fetch timer 136 may be set to a value high enough to avoid unnecessary PSNP generation, allowing sufficient time for a potentially maximum-distance trip across the network and back, but low enough to recover reasonably quickly in the case of a lost PSNP.

This process continues until all of the needed but pruned link state messages have been received by link-state routing protocol 111 and refreshed to the needed adjacencies (NO of 191). In this way, all "needed" partial link state messages are replaced with corresponding complete link state messages retrieved from other neighboring routers. If those routers have similarly pruned the needed link state message, the routers in turn request the link state message from their neighbor routers. Once the needed link state messages have been received, flooded to adjacencies, and acknowledged pruning module 132 may again prune the link state message as described in reference to the flowchart of FIG. 5.

Various embodiments of the invention have been described. These and other embodiments are within the scope of the following claims.

The invention claimed is:

1. A method comprising:
establishing a link-state routing adjacency between a first router and a second router over a layer-two (L2) communication medium in accordance with a flooding-based link-state routing protocol;
receiving, with the first router, a link state message in accordance with the link state routing protocol, wherein the link state message contains link state data for a flooding domain of the link state routing protocol;
storing the link state message to a database of the first router;
flooding the link state message from the first router to at least a third router of the flooding domain; and
after receiving an acknowledgement from the third router, pruning at least a portion of the link state data from the link state message stored within the database without deleting the entire link state message.

2. The method of claim 1, further comprising:
identifying an event requiring the first router to flood the link state message including the pruned link state data to the flooding domain;

outputting a database synchronization message from the first router to direct the second router to re-flood the link state message to the first router;

receiving a copy of the link state message from the second router, wherein the copy of the link state message contains the link state data; and flooding the copy of the link state message from the first router to the flooding domain.

3. The method of claim 2, further comprising:

after receiving the copy of the link state message, updating the database to store the copy link state message; and after receiving an acknowledgement for the copy of the link state message, pruning at least a portion of the link state data from the copy of the link state message stored within the database.

4. The method of claim 2, wherein outputting a database synchronization message comprises outputting a partial sequence numbers packet data unit (PSNP) specifying the link state message, wherein the first router forms the PNSP to specify a sequence number for the link state message that is lower that a current sequence number associated with the link state message to direct the second router to re-flood the link state message to the first router.

5. The method of claim 2, wherein outputting a database synchronization message comprises outputting a complete sequence numbers packet data unit (CSNP) describing an entire content of the database to the second router, wherein the first router removes an entry for the link state message from the CSNP to direct the second router to re-flood the link state message to the first router.

6. The method of claim 3, wherein storing the link state message to a database of the first router comprises creating an entry to store at least a portion of a header of the link state message and a payload of the link state message containing the link state data, and wherein pruning at least a portion of the link state data from the link state message stored within the database comprises pruning comprises removing at least a portion of the link state data of the payload from the entry within the link state database without deleting the header from the entry.

7. The method of claim 6, wherein updating the database to store the copy link state message comprises rewriting the link state data from the copy of the link state message to the payload stored within the entry of the database.

8. The method of claim 2, further comprising:

upon identifying an event requiring the first router to flood the link state message to the flooding domain, updating the database to mark the link state data of the link state message as needing to be restored;

starting a fetch timer to trigger retrieval of the link state data; and periodically outputting the database synchronization message from the first router in accordance with the link state time until the copy of the link state message is received.

9. The method of claim 2, wherein establishing the link-state routing adjacency between the first router and the second router comprises sending the second router a message specifying a minimum packet interval for the routing adjacency; and wherein receiving the copy of the link state message from the second router comprises receiving a plurality of link state messages flooded from the second router to the first router over the L2 communication medium, wherein the flooded link state messages are received at a rate that maintains at least the specified minimum packet interval between each of the link state messages.

10. The method of claim 9, wherein receiving the plurality of link state messages flooded from the second router comprises:

receiving a subset of the plurality of link state messages with the first router up to a packet credit allocated by the first router;

allocating additional packet credit for the adjacency with the first router;

communicating the additional packet credit to the second router; and receiving a remaining portion of the plurality of link state messages.

11. The method of claim 10, wherein the packet credit specifies one of a number of packets or a number of bytes allocated for the routing-protocol adjacency.

12. The method of claim 9, wherein flooding the copy of the link state message to the flooding domain comprises flooding the copy of the link state message from the first router to the third router as one of the plurality of link state messages, and wherein the first router maintains an interval between each of the plurality of link state messages when flooding the plurality of link state messages that meets or exceeds a minimum packet interval specified by the third router.

13. The method of claim 12, wherein flooding the copy of the link state message from the first router to the third router as one of the plurality of link state messages comprises flooding a subset of the plurality of link state messages with the first router up to an allocated packet credit and waiting until additional credit is received from the third router before flooding a remaining portion of the plurality of link state messages.

14. The method of claim 13, wherein establishing the link-state routing adjacency between the first router and the second router comprises exchanging a Type, Length, and Value (TLV) that includes a first sub-field to specify a minimum packet interval for the adjacency and a second sub-field to specify a packet credit allocated to the adjacency.

15. The method of claim 1, wherein pruning at least a portion of the link state data from the link state message comprises applying a set of pruning rules to a payload of the link state message and pruning one or more portions of the payload that satisfies criteria specified by the rules.

16. A routing device comprising:

a network interface to send and receive packets over a layer-two (L2) communication medium;

a control unit coupled to the network interface;

a flooding-based link state routing protocol executing on a processor of the control unit, wherein the link-state routing protocol establishes an adjacency with a peer router over the layer-two (L2) communication medium; and a database having entries that store a plurality of link state messages for a flooding domain of the link state routing protocol, wherein at least one of the entries in the database stores a partial link state message having a header portion and a payload having pruned link state data.

17. The routing device of claim 16, wherein the link state routing protocol receives the link state messages from a second router of the flooding domain, and wherein the link state routing protocol stores the link state message to the entries of the database of the first router, floods the link state message to a third router of the flooding domain and, after receiving an acknowledgement from the third router, prunes at least a portion of the link state data from at least one of the link state messages stored within the database without deleting the entire link state message to form the partial link state message.

18. The routing device of claim 16, further comprising:
a set of pruning rule specifying criteria for identifying link state data to be pruned from the database; and
a pruning module executing on the control unit that applies the pruning rules to the entries within the database and prunes at least a portion of the link state data from any of the link state messages stored within the database that satisfy the criteria without deleting the header portion of the link state messages from the entries.

19. The routing device of claim 16, further comprising:
a rebuild module executing on the control unit to identify an event requiring that at least some of the link state data pruned from the database is required to be flooded to the flooding domain,
wherein the rebuild module outputs a database synchronization message that describes directs the second router to re-flood a complete version of the partial link state message.

20. The routing device of claim 19, wherein the database synchronization message comprises a partial sequence numbers packet data unit (PSNP) specifying an identifier for the partial link state message and a sequence number for the link state message that is lower than a current sequence number recorded within the database for the partial link state message to direct the second router to re-flood the complete version of the partial link state message.

21. The routing device of claim 19, wherein the database synchronization message comprises a complete sequence numbers packet data unit (CSNP) describing an entire contents of the database to the second router, wherein the first router removes an entry for the link state message from the CSNP to direct the second router to re-flood the complete version of the partial link state message.

22. The routing device of claim 19, wherein, upon receiving the complete version of link state message re-flooded by the second router, the link state routing protocol floods the link state message to the flooding domain.

23. The routing device of claim 19, further comprising a fetch timer to trigger retrieval of pruned link state data,
wherein each of the entries of the database include a flag to mark the link state data as needing to be restored, and
wherein, upon identifying the event, the rebuild module updates the database to mark the link state data of the partial link state message needing to be restored, starts the fetch, and periodically outputs the database synchronization message from the first router in accordance with the link state time until the copy of the link state message is received.

24. The routing device of claim 16, further comprising:
a database that stores a minimum packet interval specified by peer routers within the flooding domain;
an outbound packet queue to store a plurality of link state messages generated by the link state routing protocol to be flooded to the peer routers over the L2 communication medium; and
a scheduler that dequeues the link state messages from the outbound packet queue and floods each of the link state messages to the L2 communication medium,
wherein the scheduler maintains at least the specified minimum packet interval between each of the plurality of link state messages when flooding the plurality of link state messages to the L2 communication medium.

25. The routing device of claim 24,
wherein the database includes records for the peer routers, each of the records specifying a minimum packet interval specified by the respective router for flooding link state messages to the router,
wherein, when the L2 communication medium comprises a point-to-point communication medium, the scheduler operates in a first mode in which the scheduler floods the plurality of link state messages to the L2 communication medium with a time interval between successive link state messages that exceeds the minimum packet interval specified by the peer router, and
wherein, when the L2 communication medium comprises a multi-access communication medium, the scheduler operates in a second mode in which the scheduler: (a) accesses the database to identify a longest minimum packet interval specified by any of the plurality of routers having the adjacencies over the L2 communication medium, and (b) floods the plurality of link state messages to the L2 communication medium with a time interval between successive link state messages that exceeds the identified minimum packet interval for the plurality of routers.

* * * * *